United States Patent [19]

Carnes

[11] Patent Number: 4,973,131

[45] Date of Patent: Nov. 27, 1990

[54] MODULATOR MIRROR

[75] Inventor: Rex G. Carnes, Hazelwood, Mo.

[73] Assignee: McDonnell Douglas Corporation, Long Beach, Calif.

[21] Appl. No.: 306,615

[22] Filed: Feb. 3, 1989

[51] Int. Cl.⁵ .......................... G02B 5/28; G01B 9/02
[52] U.S. Cl. ................................... 350/166; 350/164; 356/352
[58] Field of Search ................. 350/164, 166; 356/352

[56] References Cited

U.S. PATENT DOCUMENTS

| 2,381,728 | 8/1945 | Dimmick | 356/352 |
| 4,324,475 | 4/1982 | Purdie | 356/352 |
| 4,377,324 | 3/1983 | Durand et al. | 350/166 |
| 4,400,058 | 8/1983 | Durand et al. | 350/166 |
| 4,553,816 | 11/1985 | Durand et al. | 356/352 |
| 4,609,822 | 9/1986 | Roche | 356/352 |
| 4,859,060 | 8/1989 | Katagiri et al. | 356/352 |

OTHER PUBLICATIONS

Eugene Hect, Alfred Zajac, *Optics,* Adelphi University, Addison-Wesley, Publishers, Menlo Park, Calif. 1979, pp. 313–316.

*Primary Examiner*—Bruce Y. Arnold
*Assistant Examiner*—Martin Lerner
*Attorney, Agent, or Firm*—Gregory A. Cone; John P. Scholl

[57] ABSTRACT

This modulator mirror comprises at least two partially transparent reflector stacks bonded to two separate substrates held apart by spacers to create a parallel gap between the partially transparent reflector stacks wherein the gap has a reference spacing of an even number of quarter wavelengths of the light energy contained within the beam to be modulated. The modulation is accomplished by causing a physical displacement between the two substrates such that the gap spacing varies between the reference pass position of the even number of quarter wavelengths and a second reference no pass position of about ± one quarter wavelength. The physical motion may be accomplished by electrostatic, piezo-electric, magnetic or other means.

3 Claims, 3 Drawing Sheets

MODULATOR MIRROR

BACKGROUND OF THE INVENTION

This invention relates to modulation devices for light beams. More particularly, this invention relates to the use of partially transparent reflector stacks which are physically displaced relative to each other to accomplish the modulation of a beam which is either transmitted through or reflected from the ensemble of partially transparent reflector stacks depending on the modulation state.

This modulator is designed to operate upon a collimated or nearly collimated beam of light to achieve modulation by means of either electrical, mechanical or acoustical input signals to the device. This is a accomplished by varying the spacing between two partially transparent reflector stacks by means of piezo-electric, electrostatic, magnetic or magneto strictive manipulation or direct mechanical or acoustical manipulation of the spacing between the partially transparent reflector stacks.

The partially transparent reflector stacks are made up by a carefully controlled sequence of deposition of alternating layers of high and low index of refraction materials, each of which is a precisely controlled fraction in optical thickness reference to the wavelength of the light beam.

Present means of achieving optical modulation of light require the light to be transmitted a macroscopic distance through a non-linear optical material subject to optical damage and degradation by exposure to ionizing radiation. For example, Kerr and Pockels cells and other similar devices have been utilized to Q-switch light beams. However, these devices are rather cumbersome and require relatively high voltages to operate. Some of these devices also require associated polarizing components for their operation. The present device in contrast can be made to have an optical length of less than a millimeter. It is a stand alone device which does not require separate polarizing components and can be designed for inherent stability at a given wavelength and in an environment which contains high levels of ionizing radiation.

SUMMARY OF THE INVENTION

The modulator mirror assembly of this invention comprises at least two multilayer interference filters, also known as partially transparent reflector stacks, which are moved relative to each other to achieve almost 100% reflection or, on the other hand, almost 100% transmission of an incoming light beam of interest, depending upon whether the spacing between the partially transparent reflector stacks is an even or an odd number of quarter wavelengths of the light energy in the light beam. In its simplest embodiment, one of the partially transparent reflector stacks is deposited as a series of optical coatings, each one quarter wavelength in thickness, upon a first substrate while the other quarter wave stack is deposited on a second substrate such that the two quarter wave stacks face each other and are separated by a parallel gap. The quarter wave stacks on each of the substrates will be deposited as a series of alternating high and low index of refraction optical layers. This modulator will function between a pass and a no pass condition. The pass condition will be one of nearly complete transmission through the modulator and the no pass condition will be accomplished by nearly 100% reflectance from the modulator. The high transmittance or pass condition is achieved when the the spacing of the parallel gap is an even number of quarter wavelengths. The no pass condition is achieved when the gap spacing is altered to an odd number of quarter wavelengths. The gap may be varied by a number of different means. These means include indirect techniques such as piezo-electric, electrostatic, magnetic or magneto strictive methods and may also be accomplished by direct mechanical or acoustical forces acting upon the modulator.

DETAILED DESCRIPTION OF THE INVENTION

As was discussed briefly above, the broad concept of the invention is to physically vary the gap spacing bet the two partially transparent reflector stacks. The technique described to accomplish this hereinafter is by utilizing electrostatic forces; however, the broad scope of the invention should not be so limited.

Figure 1:
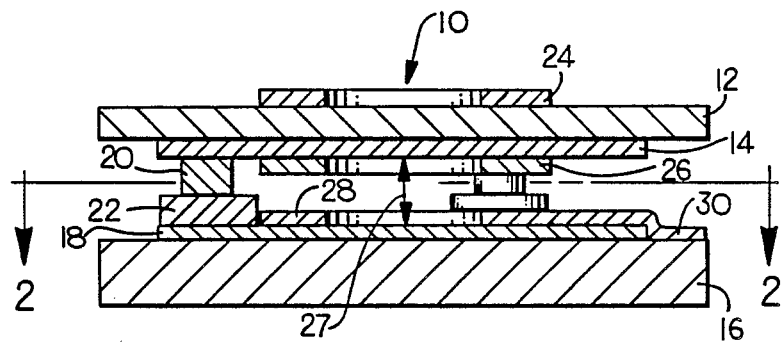
FIG. 1 is a cross sectional view of the modulator taken along a transverse cut when viewed from the edge of the modulator.
Figure 2:
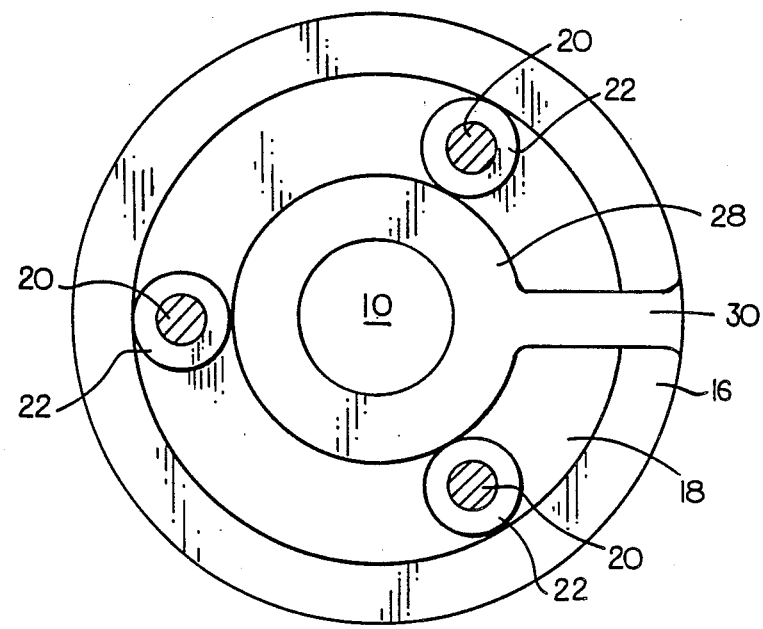
FIG. 2 is a sectional view taken along the section lines shown in FIG. 1 showing the interior of the modulator looking down onto the metallization and underlying optical coatings which cover the second substrate view from the perspective within the gap.

The structure of this embodiment is shown in FIGS. 1 and 2. The modulator is configured as a circular stack of components in essence. The foundation of the modulator would be the two substrates 12 and 16 shown in FIG. 1. These are made of material(s) transparent to the wavelength of interest. Prior to assembly into the unified configuration shown in the figures, each of the substrates has a series of depositions emplaced onto it. The first substrate is first coated with a series of individual optical coatings which make up the quarter wave stack 14. Normally on a low index substrate, the first layer to be deposited will be a relatively high index of refraction material such as titanium dioxide, although other materials could be used. The alternating lower index of refraction material could be a material such as silicon dioxide, although again other materials could be utilized. Several of these alternating layers are built up. Increasing the number of layers increases the performance of the device; however, a point of diminishing returns is reached. After the deposition of the final layer for the quarter wave stack 14, deposition of the electrode layers 24 and 26 is done. These are basically annular shaped metallic depositions having an open area 10 in the middle for the transmission or reflectance of the light beam. Although not shown in FIG. 1, these electrode layers 24 and 26 would also have a lead out to the side such as is shown in FIG. 2 for a corresponding electrode layer 28 with its electrode lead 30 out to the perimeter of the modulator.

The second substrate 16 has its own series of depositions. The quarter wave stack 18 is built up in much the same manner as it was in conjunction with the first substrate. It is capped by an electrode layer 28 which also has an open area in the central region of the modulator. The stand-off distance of the gap 27 between the layers on the two sections 12 and 14 is defined by a series of spacers around the perimeter of the device. The spacers here comprise a spacer pad 22 with a separate spacer extension 20. The spacers may be deposited on one or both facing substrates.

The thicknesses in FIG. 1 have been grossly exaggerated to illustrate the different features of the structure. In fact, the distance between the respective outside faces of the quarter wave stacks 14 and 16 would be on the order of 2 wavelengths in the structure considered here. Once the two portions of the structure are bonded together at the spacers, the structure is ready for operation. Operation would be accomplished by causing the gap spacing 27 to change in the central open area 10 by flexing the first substrate 12 in response to the electrostatic forces acting between the various electrode layers 24, 26 and 28.

Turning to FIG. 2, this view illustrates a cut away view looking down on the lower substrate with its layers from the perspective of the interior of the gap taken along the section lines in FIG. 1. The central clear area 10 is shown surrounded by the electrode layer 28 with its lead out to the perimeter 30. The quarter wave stack 18 extends out almost to the perimeter of the substrate 16 and also is found within the central gap 10. Three spacers are shown distributed around the outside edge of the structure with the spacer pads 22 and spacer extensions 20 shown. The first substrate 12 with its layers would be mounted down onto the spacers and lined up so that the central areas 10 were coaxial A calculation was done to determine the force required to deflect the first substrate 12 for full modulation of the structure in terms of the voltage required to achieve such a force in an electrical field actuated modulator for use at a wavelength of 1064 nanometers.

An expression for the deflection of a circular flat plate under a given load over a central circular area is given in *Kent's Mechanical Engineer's Handbook*, twelfth edition, page 8–32, table 9, John Wiley and sons, Inc. 1956.

$$Y_{max} = \frac{-3F(m^2 - 1)}{16 \pi E m^2 t^3} \left[ \frac{(12m + 4) a^2}{m + 1} - 4r_o^2 \ln \frac{(a)}{(r_o)} \frac{-(7m + 3)r_o^2}{m + 1} \right]$$

where:
$Y_{max}$ = deflection of plate from original position
F = total applied load (force in newtons)
t = plate thickness = $2.54 \times 10^{-4}$ m (0.010")
E = modulus of elasticity = $7.2 \times 10^{10}$ nt/m²
m = reciprocal of Poisson's ratio = approx. 4 for silica
r = radial distance from plate center = $3.5 \times 10^{-3}$ m
a = total plate radius = $7 \times 10^{-3}$ m solving for F: (the reciprocal is easier to manipulate)

$$\frac{1}{F} =$$

$$\frac{-3(m^2 - 1)}{16\pi Y_{max} E m^2 t^3} \left[ \frac{(12m + 4) a^2}{(m + 1)} - 4r_o^2 \ln \frac{(a)}{(r_o)} \frac{-(7m + 3)r_o^2}{m + 1} \right]$$

$Y_{max}$ for total modulation is a quarter wave optical thickness at the utilization wavelength (lambda$_o$).

$$Y_{max} = \text{lambda}_o/4n$$

where:
n is the index of refraction of the spacer medium $$Y_{max} = \frac{1.064 \times 10^{-6} m}{4} = 2.66 \times 10^{-7} m \text{ (or 266 } nm\text{)}$$

$$\frac{1}{F} = \frac{-3 (15) [3.997 \times 10^{-4} m^2]}{16 (2.66 \times 10^{-7} m)(7.2 \times 10^{10} nt/m^2) (16) (2.54 \times 10^{-4} m)^3}$$

F = $-1.403 \times 10^{-2}$ nt (The negative sign indicates downward deflection of a horizontal plate.)

The force generated by a potential difference between two parallel plates of an electrical capacitor ignoring edge effects is:

$$F = \tfrac{1}{2}\epsilon_o \frac{KAV^2}{d^2}$$

where:

$\epsilon_o = 8.85 \times 10^{-12}$ farad/m
K = 1 for vacuum $K = 1$ for vacuum $A$ = area of annular electrode in $m^2 = \pi(r_2^2 - r_1^2)$
   = $3.142 \times 10^{-5} m^2$ $d$ = distance between plates in meters d = distance between plates in meters A 4th order spacer at a $1.064 \times 10^{-6}$m wavelength is 1.408 microns assuming that metallization thicknesses decrease total plate spacing with a 3600 Angstrom thick metallization at each surface.

V = potential difference between plates solving for Voltage:

$$V = d \sqrt{\frac{(2F)}{(\epsilon_o K A)}}$$

V = 1.408 ×

$$10^{-6} m \sqrt{\frac{(2) (1.403 \times 10^{-2} nt)}{(8.85 \times 10^{12} \text{farad}/m) (1) (3.142 \times 10^{-5} m^2)}}$$

V = 14 volts for full modulation.

This analysis assumes that the contribution to the plate stiffness of the substrate 12 by the metallization layers 24 and 26 is negligible. Also, that the optical coatings in the quarter wave stack 14 change the plate stiffness by an amount which is negligible for a first approximation. Finally, the effect of the optical aperture 10 on the force distribution between the metallizations can also be ignored for a first approximation.

Three factors will have an effect upon the allowable potential between the reflectors: the Paschen curve for electrical breakdown between electrodes at varying gas pressures and spacings; the ionization potentials of the electrodes; and the potential which will cause sufficient displacement to cause the reflectors to touch each other. In extreme situations, the gap may have to be maintained in vacuum or filled with a high ionization potential fluid.

Figure 3:
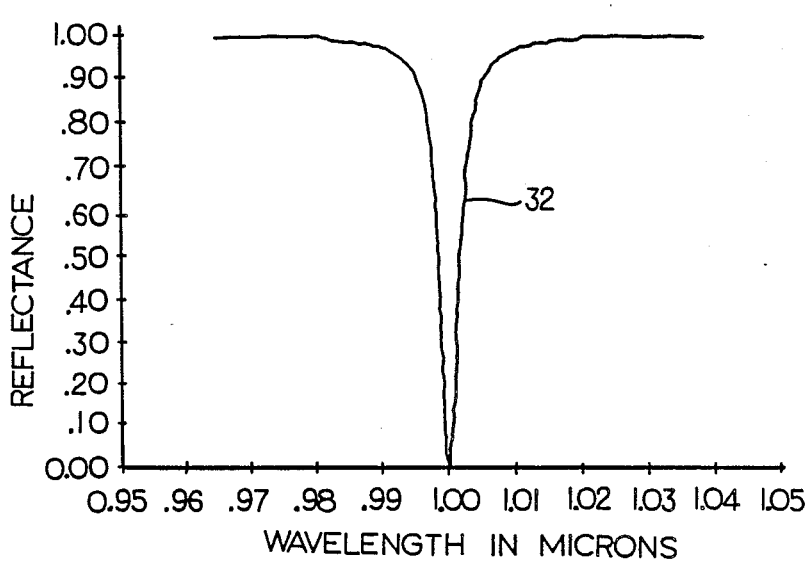
FIG. 3 is a graph showing the reflectance characteristic of the modulator as a function of the wavelength of the light beam.

The performance of a single cavity device constructed in this fashion was calculated and is displayed in the graph in FIG. 3. The particular structure utilized as the basis for this calculation would have for its layers the sequence: substrate 1//HLHLHLH//gap//HLHLHLH//substrate 2. FIG. 3 shows a sharp dip in the reflectance curve 32 at a 1 micron wavelength. This is a single cavity design and is very simple but produces an extremely sharp low reflectance feature, which means the production tolerances would be so small that realization of the performance predicted for this structure would be difficult to achieve in practice. Similar fabrication difficulties apply for two cavity designs. However, it may be that in some circumstances the very high slopes could be used to advantage to meet slew rate requirements for particular modulation applications.

Figure 4:
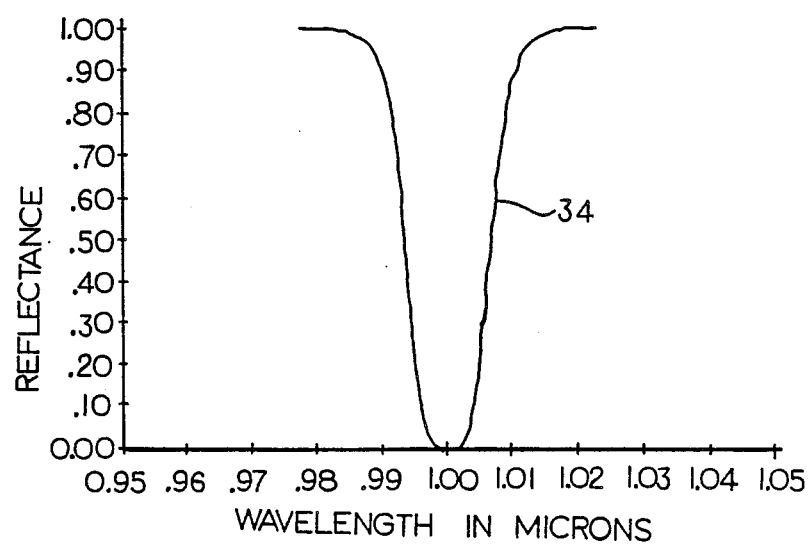
FIGS. 4, 5 and 6 are graphs showing the reflectance characteristic of a three cavity embodiment of the modulator as a function of the wavelength as the gap spacing varies through three positions.
Figure 6:
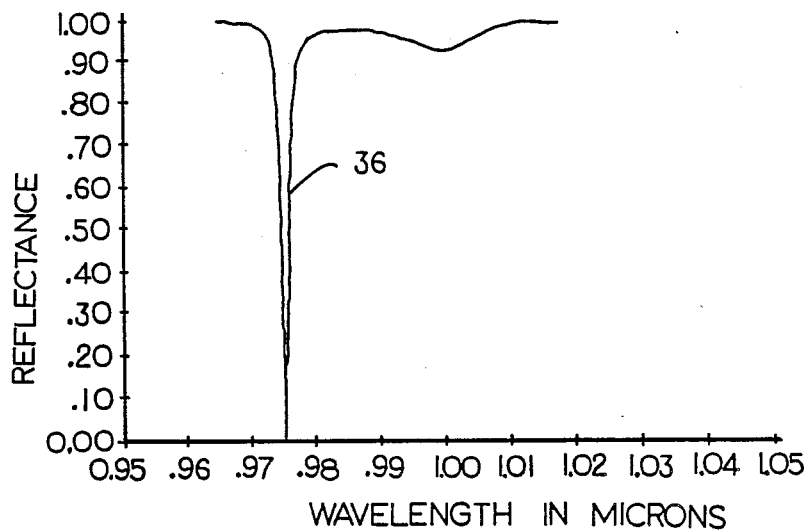
Figure 5:
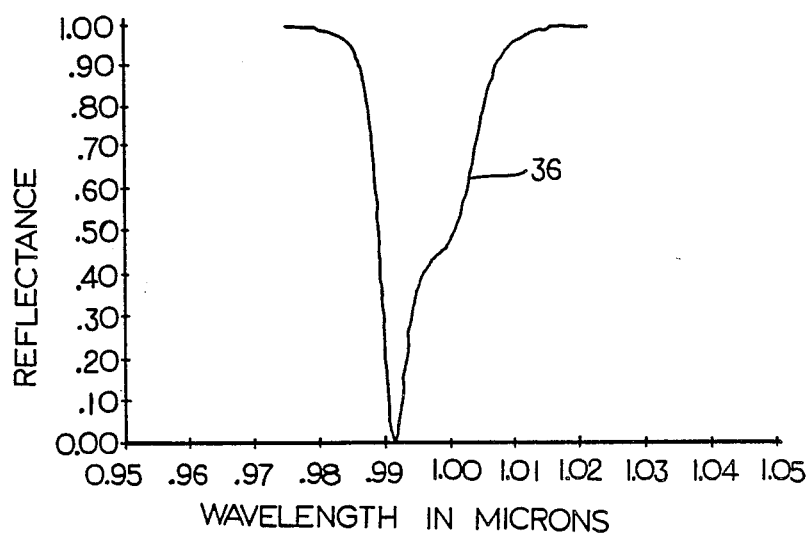

I have determined that a three cavity device will produce a much wider low reflectance region as is shown in FIG. 4 and could be more readily fabricated with existing production technology. The particular structure for this three cavity design is as follows: substrate 1//HLHLHmmHLHLHLHLHLH//gap//HLHLHLHLHLHmmHLHLH//substrate 2. Here the substrates are both silica, H is a high index of refraction layer such as titanium dioxide, L is a lower index of refraction layer such as silicon dioxide and the mm layer is a double layer of silicon dioxide. FIG. 4 and the preceding FIG. 3 both represent a pass condition for the modulator in which the gap spacing is an even number of quarter wavelengths. FIGS. 5 and 6 show the change in the reflectance characteristic in the three cavity design as the gap spacing is changed. FIG. 5 represents a gap spacing that has been changed 6% of one quarter wavelength. Examination shows that at the 1 micron level the transmission has decreased over 40%. In FIG. 6, the condition represents 24% change in distance of one quarter wavelength. Examination of this graph indicates that the transmission has decreased to less than 10%. The curve 36 shows a new high transmittance feature at about 0.975 microns; however, this would be considered to be outside of the range of interest for the wavelength to be considered.

Other embodiments are also possible. For a piezoelectric imPlementation, the substrate 12 would be made of a transparent piezoelectric material which would be driven by electrodes 24 and 26 on either side of layer 12. In this situation the reflector stack 14 would be modified in shape in order that the electrode 26 could contact the piezoelectric layer 12 directly. The gap displacement 17 could be fine tuned electrostatically via electrode 26. Magnetic forces could be utilized by passing current through spiral ribbon electrode emplaced around the window 10 in place of the annular electrodes 26 and 28.

The simplest embodiment will utilize quarter wave layers in the reflector stacks. However, other thicknesses could be used so long as the optical effects are the same. Also, Rugate type filters with smoothly varying indices of refraction could be used.

It is claimed:

1. A modulator for an optical system utilizing a beam of light containing energy in a narrow range about a wavelength of interest, the modulator comprising:

a first interference filter having two sides comprising a plurality of alternating first and second layers, both layers having an individual optical thickness equal to a precisely controlled fraction of the wavelength of the beam, the first layer comprising a high index of refraction material, and the second layer comprising a low index of refraction material, the first side of the filter being attached to a first transparent substrate through which the beam first enters the modulator;

a second interference filter having two sides comprising a plurality of alternating first and second layers, both layers having an individual optical thickness equal to a precisely controlled fraction of the wavelength of the beam, the first layer comprising a high index of refraction material, and the second layer comprising a low index of refraction material, the first side of the filter being attached to a second transparent substrate through which the beam exits the modulator when a beam transmission maximum exists;

wherein the second sides of the two interference filters face each other and are separated by sufficient spacer pads of equal thickness to define a parallel gap which is maintained at a relative vacuum between the second sides; and means to cause relative motion of about one quarter wavelength between the two filters referenced to a first spacing of the parallel gap of an even multiple of quarter wavelength at which the transmission of the beam out of the modulator will be at a maximum wherein the means to cause relative motion comprises a first conductive metallization mechanically connected to the first interference filter and a second conductive metallization mechanically connected to the second interference filter wherein each metallization is connected to the modulated voltage source whereby modulation is the voltage connected to each metallization will cause th relative motion between the filters due to the action of the electrostatic forces acting between the two metallizations.

2. A modulator for an optical system utilizing a beam of light containing energy in a narrow range about a wavelength of interest, the modulator comprising:

a first interference filter having two sides comprising a plurality of alternating first and second layers, both layers having an individual optical thickness equal to a precisely controlled fraction of the wavelength of the beam, the first layer comprising a high index of refraction material, and the second layer comprising a law index of refraction material, the first side of the filter being attached to a first transparent substrate through which the beam first enters the modulator;

a second interference filter having two sides comprising a plurality of alternating first and second layers, both layers having an individual optical thickness equal to a precisely controlled fraction of the wavelength of the beam, the first layer comprising a high index of refraction material, and the second layer comprising a law index of refraction material, the first side of the filter being attached to a second transparent substrate through which the beam exits the modulator when a beam transmission maximum exists;

wherein the second sides of the two interference filters face each other and are separated by sufficient spacer pads of equal thickness to define a parallel gap containing a fluid having a high ionization potential between the second sides; and means to cause relative motion of about one quarter wavelength between the two filters referenced to a first spacing of the parallel gap of an even multiple of quarter wavelengths at which the transmission of the beam out of the modulator will be at a maximum wherein the means to cause relative motion comprises a first conductive metallization mechanically connected to the first interference filter and a second conductive metallization mechanically connected to the second interference filter wherein each metallization is connected to the modulated voltage source whereby modulation is the voltage connected to each metallization will cause the relative motion between the filters due to the action of the electrostatic forces acting between the two metallizations.

3. A modulator for an optical system utilizing a beam of light containing energy in a narrow range about a wavelength of interest, the modulator comprising:

a first interference filter having two sides comprising a plurality of alternating first and second layers, both layers having an individual optical thickness equal to a precisely controlled fraction of the wavelength of the beam, the first layer comprising a high index of refraction material, and the second layer comprising a law index of refraction material, the first side of the filter being attached to a first transparent substrate through which the beam first enters the modulator;

a second interference filter having two sides comprising a plurality of alternating first and second layers, both layers having an individual optical thickness equal to a precisely controlled fraction of the wavelength of the beam, the first layer comprising a high index of refraction material, and the second layer comprising a law index of refraction material, the first side of the filter being attached to a second transparent substrate through which the beam exits the modulator when a beam transmission maximum exists;

wherein the second sides of the two interference filters face each other and are separated by sufficient spacer pads of equal thickness to define a parallel gap containing a fluid which is selectively absorbing to wavelengths other than the wavelength of interest between the second sides; and means to cause relative motion of about one quarter wavelength between the two filters referenced to a first spacing of the parallel gap of an even multiple of quarter wavelengths at which the transmission of the beam out of the modulator will be at a maximum wherein the means to cause relative motion comprises a first conductive metallization mechanically connected to the first interference filter and a second conductive metallization mechanically connected to the second interference filter wherein each metallization is connected to the modulated voltage source whereby modulation is the voltage connected to each metallization will cause the relative motion between the filters due to the action of the electrostatic forces acting between the two metallizations.

* * * * *